United States Patent [19]
Yoda et al.

[11] Patent Number: 5,180,794
[45] Date of Patent: Jan. 19, 1993

[54] RESIN COMPOSITIONS AND PROCESS FOR FORMING TRANSPARENT THIN FILMS

[75] Inventors: Sumio Yoda, Takasaki; Nobuyuki Futamura, Maebashi; Matsuo Hashimoto, Tano; Yoshifumi Saiki, Maebashi, all of Japan

[73] Assignee: Nippon Kayaku Kabushiki Kaisha, Tokyo, Japan

[21] Appl. No.: 543,849

[22] PCT Filed: Apr. 27, 1990

[86] PCT No.: PCT/JP89/00441

§ 371 Date: Jul. 24, 1990

§ 102(e) Date: Jul. 24, 1990

[87] PCT Pub. No.: WO90/12830

PCT Pub. Date: Nov. 1, 1990

[51] Int. Cl.$^5$ .............................. C08L 63/04
[52] U.S. Cl. ..................... 525/487; 525/486
[58] Field of Search ............ 523/463, 400; 525/393, 525/396, 486, 487

[56] References Cited

U.S. PATENT DOCUMENTS

| | | | |
|---|---|---|---|
| 4,312,902 | 1/1982 | Murase et al. | 523/463 |
| 4,328,150 | 5/1982 | Kondow et al. | 523/400 |
| 4,374,879 | 2/1983 | Roberts et al. | 428/35 |
| 4,639,476 | 1/1987 | Tajiri et al. | 523/220 |
| 4,695,598 | 9/1987 | Yamamoto et al. | 523/400 |
| 4,904,721 | 2/1990 | Hanaoka et al. | 524/377 |
| 4,920,164 | 4/1990 | Sasaki et al. | 525/396 |
| 5,079,313 | 1/1992 | Okuno et al. | 528/26 |

FOREIGN PATENT DOCUMENTS

57-147560 9/1982 Japan.
63-77921 4/1988 Japan.

OTHER PUBLICATIONS

"Handbook of Epoxy Resins", Lee and Neville, Mar. 1967, pp. 11-14, 11-15, 24-28, 24-29, 24-30, 24-31, 32, 33.

Primary Examiner—Melvyn I. Marquis
Assistant Examiner—D. E. Aylward
Attorney, Agent, or Firm—Nields & Lemack

[57] ABSTRACT

A resin composition comprising
(a) a glycidyl ether of phenol novolak and/or cresol novolak,
(b) a phenol novolak and/or cresol novolak,
(c) an organic solvent, and
(d) a silane coupling agent having an aromatic ring and an amino group having active hydrogen in the same molecule;

a process for forming a transparent thin film by using a glycidyl ether of phenol novolak and/or cresol novolak and a phenol novolak and/or cresol novolak, which comprises dissolving said materials in an organic solvent, forming a coat and heat curing it to obtain a transparent thin film, wherein the improvement comprises the use of a silane coupling agent having an aromatic ring and an amino group having active hydrogen in the same molecule as additive; and transparent thin films formed from the above process.

8 Claims, No Drawings

RESIN COMPOSITIONS AND PROCESS FOR FORMING TRANSPARENT THIN FILMS

TECHNICAL FIELD

The present invention relates to resin compositions and a process for forming transparent thin films. The invention is particularly useful for forming a protective film or a smooth layer on a colored resin film formed on the surface of a glass substrate or the like.

BACKGROUND ART

Generally, an epoxy resin has been used as base material and a phenol novolak or cresol novolak has been employed as curing agent for forming a protective film or smooth layer on a colored resin film formed on the surface of a glass plate or the like. Combination of such base material and curing agent, however, was usually poor in leveling qualities and tended to form pinholes or unevenness in the produced protective film or smooth layer.

In the course of studies on protective film or smooth layer for colored resin film, especially the one for color filter for liquid crystal displays, the present inventors found previously that a thin film with excellent leveling qualities and free of pinholes could be obtained from a phenol novolak and/or cresol novolak and an amino silane-modified product of glycidyl ether of phenol novolak and/or cresol novolak by dissolving them in an organic solvent, coating the solution on a substrate such as a glass plate, then drying and curing the coat (Japanese Patent Application Laid-Open (KOKAI) No. 63-77921 (1988)).

For obtaining the aminosilane-modified product, however, it is necessary to carry out the reaction at a high temperature ranging from 60° to 140° C., and also the aminosilicon used as modifier must be reacted almost 100%. Insufficient reaction results in the formation of fine silicon particles in he reaction system, and such fine silicon particles cause scattering of transmitted light to impair the function of color filter for liquid crystal displays.

DISCLOSURE OF THE INVENTION

As a result of further studies for solving these problems, the present inventors found that in the process for obtaining a transparent thin film by dissolving a phenol novolak and/or cresol novolak and a glycidyl ether of phenol novolak and/or cresol novolak in an organic solvent, coating the resultant solution on a substrate, then drying and heat curing the coating, when a silane coupling agent having an aromatic ring and an amino group having active hydrogen in the same molecule is used as an additive, it is possible to obtain a transparent thin film having excellent leveling qualities and high smoothness without forming fine silicon particles and without requiring a reaction for aminosilane modification.

Thus, the present invention relates to a resin composition comprising:
(a) a glycidyl ether of phenol novolak and/or cresol novolak,
(b) a phenol novolak and/or cresol novolak,
(c) an organic solvent, and
(d) a silane coupling agent having an aromatic ring and an amino group having active hydrogen in the same molecule.

The present invention also relates to a process for forming a transparent thin film which comprises dissolving a glycidyl ether of phenol novolak and/or cresol novolak (hereinafter represented as epoxy resin) and a phenol novolak and/or cresol novolak (hereinafter represented as novolak) in an organic solvent, forming a coating from the solution and heat curing the coating, wherein the improvement comprises the use of a silane coupling agent having an aromatic ring and an amino group having active hydrogen in the same molecule as an additive.

The present invention further relates to transparent thin films obtained by the above-described method.

The epoxy resin used in the present invention is preferably then one having an average molecular weight of 300 to 8,000.

The novolak used in this invention is preferably of an average molecule weight ranging from 300 to 8,000.

The silane coupling agent used in the present invention is the one containing an aromatic ring and an amino group having active hydrogen in the same molecule. The aromatic ring has an ability to improve the solubility of silane coupling agent in the solvent, such as ethyl cellosolve acetate, isopropyl cellosolve acetate, etc., which is used for dissolving the novolak and epoxy resin. The amino group having active hydrogen is reacted with epoxy group in the course of drying or curing of the coat to promote uniformity of the product. It also serves for discouraging elution of silane coupling agent or its degenerates from the cured thin film. The fact is noted that n-(2-aminoethyl)aminopropyl trimethoxysilane is poor in solubility in the organic solvents, and when phenyltrimethoxysilane which shows good solubility is used, elution of aromatic group-containing silicon is observed when the formed thin film is subjected to an elution test.

Various types of silane coupling agents are usable in this invention as the silane coupling agent containing an aromatic ring and an amino group having active hydrogen in the same molecule, but those represented by the following formula (I) are especially preferred:

$$R_1CH_2CH_2CH_2Si(OR_3)_2 \overset{R_2}{|} \quad (I)$$

wherein $R_1$ is

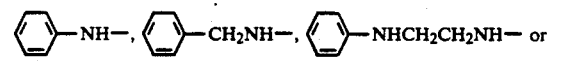

$R_2$ is a methyl, ethyl, methoxyl or ethoxyl group; and $R_3$ is a methyl or ethyl group.

Typical examples of such silane coupling agents are
γ-anilinopropyltrimethoxysilane,
γ-anilinopropyltriethoxysilane,
γ-benzylaminopropyltrimethoxysilane,
γ-benzylaminopropyltriethoxysilane,
γ-anilinopropylmethyldimethoxysilane,
γ-anilinopropylmethyldiethoxysilane,
γ-benzylaminopropylmethyldimethoxysilane,
γ-benzylaminopropylmethyldiethoxysilane, and X-12-5202 (trade name, produced by Shin-Etsu Chemical Industries Co., Ltd.).

In the present invention, the silane coupling agent having an aromatic ring and an amino group having active hydrogen in the same molecular is used preferably in an amount of 0.5 to 10 parts by weight, more preferably 1 to 5 parts by weight, to 100 parts by weight of the epoxy resin.

The epoxy resin and the novolak are used preferably in the ratio where the ratio of epoxy group in the epoxy resin to phenol group in the novolak is from 1:1.1 to 1:0.6, more preferably 1:0.95 to 1:0.8.

The organic solvent used in the present invention is the one having a high boiling point, well solubility for the silane coupling agents used in this invention and having no alcoholic OH groups. Typical examples of such organic solvent are ethyl cellosolve acetate, isopropyl cellosolve acetate, butyl cellosolve acetate, propylene glycol monomethyl ether acetate, propylene glycol monoethyl ether acetate, carbitol acetate, and diglyme.

The preferred amount of the organic solvent in the present is 0.2 to 20 times, more preferably 0.3 to 9 times the total weight of the epoxy resin and the novolak.

In the present invention, it is preferred to add a known type of imidazole compound, triphenylphosphine or the like as curing catalyst, in an amount of preferably 0.2 to 3 parts by weight, more preferably 0.5 to 1.5 parts by weight to 100 parts by weight of the epoxy resin.

The imidazole compounds usable (as curing catalyst) in this invention are, for example, those represented by the following formula (II):

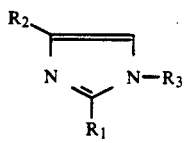

wherein $R_1$ is an alkyl group such as methyl, ethyl, isopropyl and undecyl; $R_2$ is H or an alkyl group such as methyl; and $R_3$ is H,

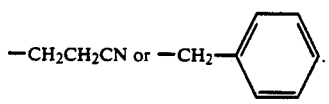

Typical examples of such imidazole compounds are 2-ethyl-4-methylimidazole, 2-methylimidazole, 2-ethylimidazole, 2-isopropylimidazole, 2-undecylimidazole, 1-cyanoethyl-2-methylimidazole, 1-cyanoethyl-2-ethyl-4-methylimidazole, and 1-cyanoethyl-2-undecylimidazole.

The thin film forming process according to this invention can be changed depending on the type and concentration of epoxy resin, novolak, solvent and curing catalyst used, the thickness of the film to be formed and other factors, but usually a process is preferred in which coating is formed by spin coat method, roll coat method or the like, followed by pre-baking at 70° to 100° C. for 20 to 60 minutes, and after drying away the solvent, the coating is subjected to post-baking at 140° to 180° C. for 1 to 8 hours to effect curing. The curing temperature may not be constant and it is possible to employ a temperature raising method.

According to the present invention, it is possible to obtain transparent thin films having a thickness of preferably 0.1 to 5 μm, more preferably 0.2 to 3 μm.

The process of this invention is useful for forming a protective film or smooth layer on a colored resin film formed on the surface of a base such as glass. This process proves especially advantageous in forming a protective film or overcoat on a color filter. The transparent thin film (overcoat) formed on a color filter according to the process of this invention has excellent smoothness, so that the cell gaps of liquid crystal is made uniform to promote the performance of liquid crystal displays (LCD). Further, when transparent electrodes are formed on the transparent thin film formed on a color filter according to this invention, there is obtained an advantage that the transparent electrodes are hardly subject to cracking of creasing, owing to the excellent smoothness of the film.

BEST MODE FOR CARRYING OUT THE INVENTION

Example 1

10 g of glycidyl ether of o-cresol novolak (WPE 201, average molecular weight (ave. MW): 900) and 5.82 g of o-cresol novolak (ave. MW: 760) were dissolved in 36.91 g of ethyl cellosolve acetate. The resulting solution was added with 0.3 g of γ-anilinopropyltrimethoxysilane and 0.1 g of 1-cyanoethyl-2-ethyl-4-methylimidazole as curing catalyst, made into a homogeneous solution and filtered by a 0.1 μm mesh membrane filter. The thus prepared solution was spin coated (2,000 r.p.m., 20 sec.) on a colored resin film formed on a glass plate. After hot-air drying of the solvent at 80° C. for 0.7 hours, the coating was further subjected to a heat treatment at 160° C. for 2.0 hours to obtain a uniform pinhole-free film having a thickness of 1.0 μm. Scanning of this film by an X-ray microanalyzer showed no existence of fine silicon particles. The glass plate having thereon a colored resin film coated with the protective film was immersed in acetone at room temperature for 1.0 hour to carry out an elution test of silane coupling agent. This acetone was concentrated and subjected to a gas chromatographic analysis, but no silane coupling agent was detected.

EXAMPLE 2

A protective film was formed on a colored resin film in the same way as Example 1 except for use of 10 g of glycidyl ether of phenol novolak (WPE 178, ave. MW: 700) in place of glycidyl ether of o-cresol novolak, 6.57 g of o-cresol novolak and 38.66 g of ethyl cellosolve acetate. The obtained protective film had the same thickness and properties as that of Example 1.

EXAMPLE 3

A protective film was formed on a colored resin film according to the same procedure as Example 1 except for use of 5.27 g of phenol novolak (ave. MW: 710) in place of o-cresol novolak and 35.63 g of ethyl cellosolve acetate. The obtained protective film was identical with that of Example 1 in film thickness and properties.

EXAMPLE 4

A protective film was formed on a colored resin film in the same manner as Example 1 except for use of 5.96 g of phenol novolak in place of o-cresol novolak and 37.24 g of ethyl cellosolve acetate. The obtained protective film had a thickness of 0.95 μm and showed the same properties as the protective film of Example 1.

EXAMPLE 5

A protective film was formed on a colored resin film in the same way as Example 1 except for use of γ-benzylaminopropyltrimethoxysilane in place of γ-anilinopropylmethoxysilane. The obtained protective film was the same in thickness and properties as that of Example 1.

EXAMPLE 6

The same experiment as in Example 1 was carried out except for use of butyl cellosolve acetate, propylene glycol monomethyl ether acetate or isopropyl cellosolve acetate in place of ethyl cellosolve acetate. When using any of the organic solvents, the obtained protective film showed the same properties as that of Example 1.

EXAMPLE 7

A protective film was formed on a colored resin film in the same way as Example 1 except for use of X-12-5202 (product by Shin-Etsu Chemical Industries Co., Ltd.) in place of γ-anilinopropyltrimethoxysilane. The obtained protective film had the same thickness and properties as those of the film of Example 1.

COMPARATIVE EXAMPLE 1

A protective film was formed on a color resin film according to the same procedure as Example 1 except for use of n-(2-aminoethyl)aminopropyltrimethoxysilane in place of γ-anilinopropyltrimethoxysilane. The obtained protective film was non-uniform, and scanning of the film by an X-ray microanalyzer confirmed the presence of fine silicon particles in part. When the solution was left as it was, a sediment formed.

Comparative Example 2

A protective film was formed on a colored resin film in the same way as Example 1 except for use of γ-methacryloxypropyltrimethoxysilane in place of γ-anilinopropyltrimethoxysilane. The obtained protective film was non-uniform, and scanning of the film by an X-ray microanalyzer detected the presence of fine silicon particles in part.

Comparative Example 3

A protective film was formed on a colored resin film in the same way as Example 1 except for use of phenyltrimethoxysilane in place of γ-anilinopropyltrimethoxysilane. Although the obtained protective film was the same as that of Example 1 in film thickness and properties, phenyltrimethoxysilane was detected in an elution test with acetone

Industrial Applicability

For obtaining a protective film or smooth layer for a colored resin film or such, the process according to this invention makes it unnecessary to react and modify epoxy resin, which is the main constituent, at a high temperature, so that it is very advantageous in industrial applications. Further, according to the present invention, it is possible to obtain a very excellent protective film or smooth layer for colored resin films and such which has good leveling qualities, is free of pinholes or unevenness, and also contains no fine silicon particles which may cause scattering of transmitted light.

What is claimed is:

1. A resin composition comprising
   (a) a glycidyl ether of a novolak selected from the group consisting of phenol novolak, cresol novolak, and a combination of phenol novolak and cresol novolak;
   (b) a novolak selected from the group consisting of phenol novolak cresol novolak, and a combination of phenol novolak and cresol novolak;
   (c) an organic solvent;
   (d) a silane coupling agent having an aromatic ring and an amino group having active hydrogen in the same molecule.

2. A resin composition according to claim 1, wherein said glycidyl ether comprises epoxy groups, said novolak comprises phenol groups, and wherein the ratio of epoxy groups in the glycidyl ether (a) to phenol groups in the novolak selected from the group consisting of phenol novolak, cresol novolak, and a combination of phenol novolak and cresol novolak (b) is in the range of 1:1.1 to 1:0.6; the silane coupling agent having an aromatic ring and an amino group having active hydrogen in the same molecule (d) is contained in an amount of 0.5 to 10 parts by weight to 100 parts by weight of the glycidyl ether (a), and wherein the organic solvent (c) is contained in an amount of 0.2 to 20 times by weight the total amount of the glycidyl ether (a) and the novolak (b) selected from the group consisting of phenol novolak, cresol novolak, and a combination of phenol novolak and cresol novolak.

3. A resin composition according to claim 1 or 2, wherein the silane coupling agent having an aromatic ring and an amino group having active hydrogen in the same molecule (d) is represented by the following formula (I):

$$R_1CH_2CH_2CH_2\underset{\underset{R_2}{|}}{Si}(OR_3)_2 \quad (I)$$

wherein $R_1$ is

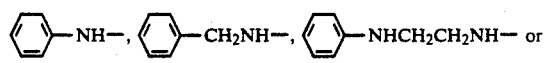, or

;

$R_2$ is a methyl, ethyl, methoxyl or ethoxyl group; and $R_3$ is a methyl or ethyl group.

4. A resin composition according to claim 1 or 2, wherein the organic solvent (c) is at least one selected from the group consisting of ethyl cellosolve acetate, isopropyl cellosolve acetate, butyl cellosolve acetate, propylene glycol monomethyl ether acetate, propylene glycol monoethyl ether acetate, carbitol acetate and diglyme.

5. In a process for forming a transparent thin film on a substrate, which comprises dissolving a glycidyl ether of a novolak selected from the group consisting of phenol novolak, cresol novolak, and a combination of phenol novolak and cresol novolak and a novolak selected from the group consisting of phenol novolak, cresol novolak, and a combination of phenol novolak and cresol novolak in an organic solvent, forming a coating of the resulting solution on said substrate, and heat curing said coating to obtain a transparent film, the improvement comprising adding to said solution a silane coupling agent having an aromatic ring and an amino group having active hydrogen in the same molecule.

6. A process for forming a transparent thin film according to claim 5, wherein the silane coupling agent having an aromatic ring and an amino group having active hydrogen in the same molecule is represented by the following formula (I):

$$R_1CH_2CH_2CH_2Si(OR_3)_2 \atop |R_2} \quad (I)$$

wherein $R_1$ is

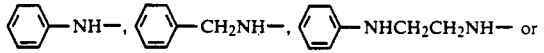, 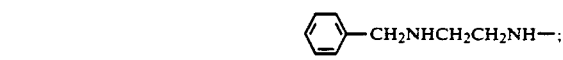

$R_2$ is a methyl, ethyl, methoxyl or ethoxyl group; and
$R_3$ is a methyl or ethyl group.

7. A transparent thin film obtained by the process according to claim 5.

8. A transparent thin film obtained by the process according to claim 6.

* * * * *